Patented Dec. 22, 1931 1,837,304

UNITED STATES PATENT OFFICE

EDWARD HYATT WIGHT, OF BALTIMORE, MARYLAND, ASSIGNOR, BY MESNE ASSIGNMENTS, TO THE OBERPHOS COMPANY, OF BALTIMORE, MARYLAND, A CORPORATION OF MARYLAND

PROCESS FOR MANUFACTURING ACID PHOSPHATE

No Drawing. Application filed April 29, 1926, Serial No. 105,566. Renewed February 6, 1929.

This invention relates to a process for manufacturing acid phosphate fertilizer.

The naturally occurring phosphate rocks comprise essentially tri-calcium phosphate, which is quite insoluble in water. In this form it cannot be assimilated by plants and hence to render it useful as a fertilizer it must be converted to an available form. This is done by treating the phosphatic raw material with sulphuric acid by which the insoluble tri-calcium phosphate is converted to the available calcium phosphates.

The usual method now employed is to mix ground phosphate rock and sulphuric acid in a suitable mixer. The resulting sludgy mass is deposited in a den and allowed to stand for a few hours during which time the reaction between the acid and rock continues. This product is removed from the den and deposited in a curing shed, where it is allowed to stand until it is cured and dry.

The processes heretofore employed have been carried out in part in open apparatus so that the reacting ingredients and reaction products have been exposed to the air, thus dissipating the exothermic heats and other elements of the reaction; and hence as a result the process has been long and of necessity requires an extended period to insure a dry and substantially completely reacted product.

It is an object of my invention to reduce the time required for the manufacture of acid phosphate and to dispense with the present curing process.

It is another object of the invention to accelerate to completion without material losses the actions occurring in the mix.

It is a further object to eliminate free acids before the drying process.

It is a still further object to maintain the components and reacting products of the mix at a high concentration.

I accomplish these and other important objects by treating a mixture of phosphatic material and a strong and stable acid in a sealed container and allowing the materials to react with exclusion of air.

In the past, as before intimated, it has been the practice to carry out the whole process of acid prosphate manufacture in an atmosphere of air. The raw materials have been mixed and allowed to stand until the reactions run to completion. As is well known, when a phosphate-acid sludge is allowed to stand in a den some mono-calcium phosphate is formed. Concomitantly with this major reaction there are others occurring which result in the evolution of gases, particularly carbon dioxide, due to the action of the acid on the carbonate impurity in the rock. This product however is not dry for it contains much free phosphoric acid and some free sulphuric acid. The elimination of the free phosphoric acid necessitates the so-called curing process.

I propose to so treat the phosphate-acid mass during the initial stages as to preclude the necessity of the present curing process.

When tri-calcium phosphate is treated with sulphuric acid the end products are mono-calcium and di-calcium phosphate and calcium sulphate. This reaction however seems to proceed in two stages. In the first stage free phosphoric acid and calcium sulphate are formed, leaving a third of the tri-calcium phosphote unattacked. In the second stage the free phosphoric acid reacts with the remainder of the tri-calcium phosphate and converts this to mono-calcium phosphate. The first reaction proceeds much more rapidly than the second because sulphuric acid is considerably more active than phosphoric acid.

The phosphoric acid is quite inactive and when it is exposed to air and cooled, as in prior processes, it takes a long time to react. The second reaction referred to before is therefore quite slow.

I have found that if the finely ground phosphatic raw material is mixed with a strong acid, preferably sulphuric acid, and heated in an autoclave so that air is excluded during reaction an increased amount of agriculturally available phosphate may be obtained in a much shorter time than could be done heretofore.

Any suitable container excluding air wherein generated pressures may be retained or not as desired may be used for this purpose; it is important, however, that a relief valve be provided so that the container may not be subjected to excessive pressure. This precaution should be particularly observed when the raw material contains a large amount of carbonate.

The material in the autoclave should be maintained at elevated temperatures up to 212° C. and in some cases as low as 70° C. By heating the mass in the autoclave the evolution of $CO_2$ and other gases is facilitated and a consequent high degree porosity of the mass is assured.

The amount of heat to be applied will depend in a large measure on the type of raw material used, for certain side reactions, such for instance as the action of sulphuric acid on the carbonate are exothermic and hence supply much of the requisite heat.

The raw materials may be first mixed and the resulting sludge run into the autoclave. It may be desirable, however, to mix the materials in the autoclave itself, and thereby eliminate one of the mechanical units involved in the process. In the second case, the cover or body of the container should be provided with a suitable stirring mechanism, such as revolving blades, and should be made strong enough to withstand pressures resulting from the evolved gases. The cover or body portion of the autoclave may be provided with a vent pipe connected to a blower so that a portion of the gases as formed may be drawn off and the pressure in the autoclave thereby regulated.

When the reacting materials are heated the initial reaction between the phosphate rock and acid is accelerated. The second reaction, that is the reaction between the free phosphoric acid and the unattacked tri-calcium phosphate proceeds best in this medium because the retardation of the reaction is prevented by heat retention and because the proportions of the components of the mix are kept substantially constant, in sharp contradistinction to prior processes in which, due to the cooling of the mass and loss of components the complete reactions are retarded.

By treating the materials in this manner, a high degree of porosity obtains in the mass which facilitates the formation of the mono-calcium phosphate and calcium sulphate. The interstitial condition of this porous mass presents an increased reaction surface and minimizes clotting of the phosphate.

When the raw materials are treated in the manner described for a sufficient time in the autoclave the product may be dumped into a bin or onto a moving belt and subjected to a current of air flowing counter to the direction of the belt. This product has substantially no free phosphoric or sulphuric acid occluded in it, hence it need only be treated to remove the water which may be present in about approximately 14%, or much less if the pressure valve is opened and this without injury to the material if the temperature is reduced to a point just above the boiling point. It will thus be seen that a curing process is not necessary and the material immediately after drying may be ground and packed for shipment.

By thus digesting the materials in an autoclave none of the components are allowed to escape; by excluding the air from the reacting material high concentration of the initial ingredients and acid reacting products is maintained and particularly of the orthophosphoric acid. The maintenance of a relatively high concentration of this acid and the provision of elevated temperature allows a complete and rapid utilization of the acid and hence the time required to complete the reaction is reduced. Since substantially no free phosphoric acid is present in the stiff mass as it is discharged from the autoclave no extending curing period, which was necessary in prior processes, is required and the grinding of the product is rendered easy.

The term stable acid as used herein designates an acid which will not readily oxidize or volatilize on exposure to air and thereby change its chemical composition. The term digestion is employed to define the initial chemical transformation or conversion resulting from the acidulation of the potentially reactive phosphatic material with a strong and stable reagent such as sulphuric or phosphoric acid.

I do not intend to be restricted to any particular apparatus for carrying out the principles of this invention. Any suitable device which will effectually carry out the process hereinabove described may be used, and hence the description of such apparatus as is given is to be considered as suggestive of only one of many mechanical means that may be employed.

I claim:

1. A process of manufacturing phosphate fertilizer comprising mixing ground phosphatic material with a strong mineral acid which will react with the material to produce available phosphates, passing the substantially unset mixture to a confined space and digesting the mixture in an atmosphere of the gaseous products of reaction and at a regulated pressure and applied superatmospheric temperature while agitating the mixture.

2. A process of manufacturing phosphatic fertilizer comprising mixing ground phosphatic material and a strong mineral acid, passing the substantially unset mixture to a confined space, agitating and digesting the mass under controlled superatmospheric pressure and temperature and drying the product.

3. A process of preparing phosphatic fertilizer comprising mixing unavailable phosphatic material with a strong mineral acid, which will react therewith to form available phosphates, passing the substantially unset mixture to a zone in which controlled pressures may be maintained and agitating and digesting the mixture under superatmospheric temperature and pressure.

4. A process of preparing phosphatic fertilizer comprising mixing unavailable phosphatic material with a strong mineral acid which will react with the material to form available phosphates, passing the substantially unset mixture to a zone in which pressure may be maintained and the exothermic heats of reaction largely retained, and digesting the mixture in said zone under superatmospheric temperature and pressure while agitating the mass.

5. A process of preparing phosphatic fertilizer comprising mixing unavailable phosphatic material with a strong mineral acid, passing the substantially unset mixture to a zone in which pressure may be maintained and the exothermic heats largely retained, digesting the mixture in said zone under controlled superatmospheric temperature and pressure while agitating the mass and drying the products of reaction.

6. The process of manufacturing phosphatic fertilizer comprising digesting a mixture of finely divided phosphatic material and a strong mineral acid which will react with the material to produce available phosphatic salts, under controlled superatmospheric pressure and temperature while agitating the mass.

7. A process of manufacturing superphosphate, comprising digesting a substantially unset mixture of unavailable phosphate rock dust and a strong mineral acid in a confined space under superatmospheric pressure and temperature, mechanically agitating the mass and retaining it in the space for a period of time sufficient to effect substantial conversion of the unavailable phosphate to available forms.

8. A process of manufacturing superphosphate comprising mixing finely ground unavailable phosphate salts and sulphuric acid, passing the mixture to a confined space and digesting it therein while mechanically agitating, and maintaining the mass under superatmospheric pressure and temperature for a period of time sufficient to convert a substantial quantity of the unavailable phosphate salts to available forms.

9. A process of manufacturing superphosphate comprising mixing ground phosphate rock and sulphuric acid, passing the substantially unset mixture to a confined space; agitating and digesting the mixture in said space under superatmospheric pressure and temperature for a period of time sufficient to effect a substantial conversion of the unavailable phosphate to available forms and then drying the solid products of conversion.

10. A process of manufacturing phosphate fertilizers comprising mixing ground phosphate rock and a strong mineral acid which will react therewith to form available phosphates, digesting the mixture in a confined space under autogenous superatmospheric pressure and applied superatmospheric temperature and for a period of time such that substantially no free acid is occluded in the product and agitating the mixture during digestion.

11. A process of manufacturing phosphate fertilizers comprising mixing ground phosphate rock and sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates and drying the conversion products.

12. A process of manufacturing superphosphate fertilizers comprising mixing ground phosphate rock and sulphuric acid, passing the substantially unset mixture to a confined space, digesting the mixture, while mechanically agitating under superatmospheric pressure and applied superatmospheric temperature, continuing the digestion for a period of time such that substantially no free acid is contained in the product, and then drying the product.

13. A process of manufacturing superphosphate comprising mixing predetermined quantities of finely ground phosphate rock and strong sulphuric acid, then passing the unset mixture to a confined space, digesting the mass, while mechanically agitating, under autogenous superatmospheric pressures and maintaining the mass at elevated temperatures during the digestion by applying extraneous heat, continuing the digestion for a period of time sufficient to effect a substantial conversion of the unavailable phosphate to available forms, and then drying the product.

14. The process of manufacturing superphosphate comprising digesting a substantially unset mixture of unavailable phosphate rock dust and sulphuric acid in a confined space under superatmospheric pressure and temperature, mechanically agitating the mass, retaining it in the space for a period of time sufficient to effect substantial conversion of the unavailable phosphate to available forms, and then drying the solid products of conversion.

15. A process of manufacturing phosphate fertilizer comprising mixing ground phosphate rock with a strong mineral acid, the rock and acid being in such proportions as would produce a plastic mass tending to set to a solid mass under atmospheric conditions, digesting the mixture in a confined space under superatmospheric pressure, and controlling the pressure in the confined space, and agitating the mass during the digestion.

16. A process of manufacturing phosphate fertilizer comprising mixing ground phosphate rock with a strong mineral acid, the rock and acid being in such proportions as would produce a plastic mass tending to set to a solid mass under atmospheric conditions, passing the substantially unset mixture to a confined space, digesting the mixture in a confined space under superatmospheric pressure and controlling the pressure in the confined space, and agitating the mass during the digestion.

17. A process of manufacturing phosphate fertilizer comprising mixing ground phosphate rock with a strong mineral acid, the rock and acid being in such proportions as would produce a plastic mass tending to set to a solid mass under atmospheric conditions, digesting the mixture in a confined space under superatmospheric pressure and temperature, controlling the pressure in the confined space to maintain the mixture in an unset condition during digestion, and continuing the digesting for a period of time such that substantially no free acid is contained in the product, and then drying the product.

In testimony whereof I affix my signature.

EDWARD HYATT WIGHT.